United States Patent
Stadter

(10) Patent No.: US 9,120,976 B2
(45) Date of Patent: Sep. 1, 2015

(54) FIRE RETARDANT MOLDINGS AND METHOD FOR PRODUCING AND USING SUCH A MOLDING

(75) Inventor: Uwe Stadter, Wiesloch (DE)

(73) Assignee: Akusta Unternehmensberatung, Wiesloch (DE)

( * ) Notice: Subject to any disclaimer, the term of this patent is extended or adjusted under 35 U.S.C. 154(b) by 14 days.

(21) Appl. No.: 13/578,480

(22) PCT Filed: Nov. 26, 2010

(86) PCT No.: PCT/EP2010/007172
§ 371 (c)(1),
(2), (4) Date: Oct. 3, 2012

(87) PCT Pub. No.: WO2011/063967
PCT Pub. Date: Jun. 3, 2011

(65) Prior Publication Data
US 2013/0072600 A1 Mar. 21, 2013

(30) Foreign Application Priority Data

Nov. 25, 2009 (DE) .......................... 10 2009 055 635
Mar. 12, 2010 (DE) .......................... 10 2010 011 228

(51) Int. Cl.
| | | |
|---|---|---|
| C09K 21/02 | (2006.01) | |
| C04B 26/02 | (2006.01) | |
| B29C 45/46 | (2006.01) | |
| C04B 103/63 | (2006.01) | |
| C04B 111/28 | (2006.01) | |

(52) U.S. Cl.
CPC ................ *C09K 21/02* (2013.01); *B29C 45/46* (2013.01); *C04B 26/02* (2013.01); *C04B 2103/63* (2013.01); *C04B 2111/28* (2013.01)

(58) Field of Classification Search
CPC ............................... C09K 21/02; B29C 45/46
USPC ........................................................ 524/13
See application file for complete search history.

(56) References Cited

U.S. PATENT DOCUMENTS

| | | | |
|---|---|---|---|
| 4,921,842 | A | 5/1990 | Henning et al. |
| 5,025,042 | A | 6/1991 | Yoshida et al. |
| 5,583,172 | A | 12/1996 | Imahashi et al. |
| 7,144,941 | B2 | 12/2006 | Sauerwein et al. |
| 2006/0142460 | A1 * | 6/2006 | Cogen et al. .................. 524/445 |

FOREIGN PATENT DOCUMENTS

| | | | | |
|---|---|---|---|---|
| DE | 3620273 | A1 | 11/1987 | |
| DE | 3727252 | A1 | 2/1989 | |
| DE | 4300261 | A1 | 7/1994 | |
| DE | 68918525 | T2 | 2/1995 | |
| DE | 10248174 | C1 | 11/2003 | |
| DE | 69334014 | T2 | 12/2006 | |
| EP | 0109408 | B1 | 8/1987 | |
| EP | 0249010 | A2 | 12/1987 | |
| EP | 0370517 | A2 | 5/1990 | |
| GB | 2278605 | A | 12/1994 | |
| JP | 7187744 | A | 7/1995 | |
| JP | 2001064526 | A | 3/2001 | |
| JP | 2008-063577 | * | 3/2008 | .............. C08L 67/00 |
| JP | 2008063577 | A * | 3/2008 | |
| WO | 0151554 | A1 | 7/2001 | |
| WO | WO 0151554 | A1 * | 7/2001 | |

OTHER PUBLICATIONS

English Translation of JP2008063577A. Obtained Dec. 19, 2013 at http://www19.ipdl.inpit.go.jp/PA1/cgi-bin/PA1DETAIL.*

Miyata et al: "Fire-Retarding Polypropylene with Magnesium Hydroxide", Journal of Applied Polymer Science, Hohn Wiley and sons Inc., New York, US, vol. 25, Jan. 1, 1980, pp. 416-419, XP002945792.

* cited by examiner

*Primary Examiner* — Ling Choi
*Assistant Examiner* — Lanee Reuther
(74) *Attorney, Agent, or Firm* — Laurence A. Greenberg; Werner H. Stemer; Ralph E. Locher

(57) ABSTRACT

A fire retardant molding contains a thermoplastic compound and an inorganic flameproof agent that is mixed with the thermoplastic compound and which acts by separating from water, having a proportion in the range of 10 wt % to 90 wt %. The fire retardant molding is produced by mixing the thermoplastic material with an inorganic flame-proofing agent, the flame-proofing agent having a proportion in the range of 20 wt % to 80 wt %, and by outputting the compound obtained by mixing, in particular as a flat product. The fire retardant molding is advantageously used, for example, in or on land-based vehicles, water-based vehicles, aircraft and buildings.

18 Claims, No Drawings

FIRE RETARDANT MOLDINGS AND METHOD FOR PRODUCING AND USING SUCH A MOLDING

BACKGROUND OF THE INVENTION

Field of the Invention

The invention relates to a fire-retardant molding and to a production process, and also to the use of a molding that includes as its constituent parts a thermoplastic composition and, mixed with the thermoplastic composition, an inorganic flame retardant.

Fire retardants or fire-retardant substances taking the form of a mixture which is a liquid or a paste and which is composed of aluminum hydroxide or of magnesium hydroxide and of a pelletized plastics material are widely applied to articles; although these have good flame-retardant properties, they not only involve comparatively complicated processing but also have only low mechanical strength and moreover require a prolonged drying time for the material.

EP 1 530 553 B1 discloses an insulation component for thermal insulation in motor vehicles which has a fire-retardant coating which is composed of from 40 to 90% by weight of a ceramic adhesive based on a waterglass solution, where from 5 to 30% by weight of a thermoplastic powder adhesive and up to 10% by weight of a blowing agent made of polymer particles and expandable on exposure to heat have been added to the adhesive, and the polymer particles have a gastight shell in which gaseous hydrocarbon has been encapsulated. Although it is also possible to add up to 20% by weight of aluminum hydroxide to the coating, the specification gives no indication of mixing aluminum hydroxide into a thermoplastic composition melted via introduction of heat, wherein, after the mixing process, the plastics compositions can be directly discharged in the form of a molding or, after the cooling process, processed to give pellets which are processable in a plastics injection molding machine to give a dimensionally stable molding which is useful in its own right. Accordingly, the material described merely involves a coating material which is directly applied to a component requiring protection and which, after hardening of the adhesive, adheres thereto. By virtue of the high proportion of ceramic adhesive present, the material described merely has the properties of a coating material which because of inadequate dimensional stability cannot be molded to give a molding which can be processed on its own without any workpiece connected therewith. The properties of the coating material of EP 1 530 553 B1, determined via the adhesive, are accordingly not comparable with the known advantageous properties of a thermoplastic material.

BRIEF SUMMARY OF THE INVENTION

Accordingly, an object of the present invention is to provide a flame-retardant material in the form of a molding which has in essence the same mechanical properties as a thermoplastic and is moreover capable of preventing and/or inhibiting spread of unrestricted fires.

The invention achieves said object via a fire-retardant molding as claimed.

Another object of the invention consists in providing a process for producing such a molding, and also providing further uses of such a molding.

The invention achieves said object via the features of the claims.

The dependent claims characterize advantageous embodiments of the invention.

A fire-retardant molding of the invention, in particular a flat product or a foil, with a thickness which is preferably more than 0.5 mm, comprises a thermoplastic composition and, mixed with the thermoplastic composition, an inorganic flame retardant in the form of aluminum hydroxide or magnesium hydroxide, which acts via elimination of water, and the proportion of which present in the composition is in the range from 10% by weight to 90% by weight, preferably from 20% by weight to 80% by weight, and particularly preferably from 30% by weight to 75% by weight, based on the total mass of the molding. As an alternative to this, it is also possible to use a mixture of the two substances.

If the proportion of the flame retardants listed is small, a mineral filler or an inorganic aggregate from the group of the following substances: barium sulfate, chalk, calcium carbonate, and ground limestone can be added to the thermoplastic composition. The addition of other mineral substances provides the advantage that said substances do not burn and act as fillers which are inert in the event of a fire. In particular, said mineral fillers can be less expensive than the inorganic flame retardant.

It is also possible, in addition or as an alternative to the above, by way of example to add 0.5% by weight of carbon black to the thermoplastic composition. The addition of carbon black to the mixture of thermoplastic and of inorganic flame retardant can raise the UV-resistance of the material of the invention. It is also possible to achieve any desired color by using other colorants.

It is preferable that the fire-retardant molding of the invention is composed here exclusively of the thermoplastic composition, of the inorganic flame retardant in the abovementioned range of amounts, and optionally of one or more of the last-mentioned fillers and/or carbon black, where these are admixed with the molten thermoplastic composition without further chemical additions and binders. It has been found here that the thermoplastic composition itself acts advantageously as a binder for the inorganic flame retardant and the other inorganic substances.

With the fire-retardant molding of the invention it is possible to provide a fire-protection barrier which is incombustible in accordance with the known relevant standards. The fire-protection barrier inhibits fire spread, and when direct contact with flame occurs, there is no spread of fire and almost no heat propagation or onward transmission. The molding of the invention preferably serves for protection of inflammable products. In particular, the fire-protection barrier can be produced in the form of finished product with fire-protection properties in accordance with the regulations of automobile standards, the regulations of the European construction industry, and/or the fire-protection provisions of other, non-European, countries.

The fire-protection barrier of the invention can advantageously be used to inhibit ignition and combustion of plastics, wood, or aluminum. It is moreover possible to reduce or retard spread of heat to solid substances, such as minerals, plastics, wood, or metal, and thus to achieve an improvement here in terms of fire protection.

The fire-retardant molding of the invention can, in particular in the form of flat product, foil, roll product, or sheet product, be connected to other products via mechanical fastening and/or via adhesive bonding. Handling and processing here are simple and can be achieved by a manual operator or by any person having manual skills, where said person in particular lays, adhesive-bonds, or fastens the fire-retardant molding on the products requiring protection. Adhesives can be used for this purpose, for example polyurethanes, solvent-based adhesives or water-based adhesives, or two-component adhesives. As an alternative, it is possible to extrude the fire-retardant molding in the form of extruded profile, in the form of pipe, or in the form of duct, for water, air, or else for cables, or else in the form of coherent sheathing for any other article requiring protection.

In the same way, the fire-retardant molding of the invention can be used as fire-protection curtain, as covering, or as supportive sheet. In particular, the embodiments of the fire-retardant molding in appropriate geometric form, in particular in respect of dimensions and of shaping, can be used as cladding for steel supports, as cladding for timber supports, as cladding foil for pipe ducts, as pipe duct for breaches, or as protective pipe for service ducts.

It is moreover possible to produce separate fire-retardant moldings by production processes such as injection molding, blowing, or thermoforming.

An advantage of the invention is that when the molding of the invention is in contact with flame no foreign products hazardous to health are produced, and the molding itself is also in particular free from carcinogenic substances.

Whereas widely used fire-retardant substances require disposal they have to be treated as special waste rather than household waste, the molding of the invention is advantageously classified as household waste. Residues of the molding after use, and wastes after a fire, can accordingly be sent for disposal at low cost.

The gases emitted on contact with flame comprise no, or only a very small amount of, cleavage products, and they do not therefore cause any impairment of health in the event of a fire. Surprisingly, despite the plastics content in the fire-retardant moldings there is moreover no discharge of gases which are inflammable and possibly toxic, even after prolonged direct contact with flame. The smoke produced on direct contact with flame is moreover of very low density and is in particular free from chlorine, bromine, and heavy-metal compounds.

Thermal conductivity is very low by virtue of the oxidation process that takes place on direct contact with flame, i.e. the temperature rises only slightly on the side facing away from the flame.

The thermoplastic composition of the fire-retardant foil can comprise a material from the group of the following substances: polyethylene (PE), ethylene-vinyl acetate (EVA), ethylene-propylene-diene rubber (EPDM), ENGAGE, polypropylene (PP), and polyamide (PA). The following individual plastics melt at different temperatures without the mixture of the invention with an inorganic flame retardant: polyethylene at 120° C., EVA at 180° C., ENGAGE at 200° C., polypropylene at 230° C. and polyamide at 250° C. Polyvinyl chloride (PVC) can be used, but a factor that has to be taken into account is that combustion thereof produces chlorine-containing cleavage products which are hazardous to health. The thermoplastic can also be a copolymer. The fire-protection barrier of the invention comprises one of the thermoplastics mentioned or other thermoplastic olefins, where these are usually used in the form of pellets. It can also include synthetic mineral oils. Addition of fillers with high density, e.g. barium sulfate, to the desired plastics advantageously produces moldings of the invention which, in addition to their specific mechanical properties, which very substantially correspond to those of the underlying plastics used, also have improved sound-deadening or acoustic-damping properties.

For one embodiment of the fire-retardant molding of the invention, stiffness, flexural softness, and/or temperature-related behavior are influenced via specific selection of the plastic. By way of example, when polypropylene is used it is possible to produce a molding, in particular a sheet, which is stiffer in comparison with other plastics. There is no impairment of fire performance here. The flexural softness of the fire-protection barrier of the invention also advantageously gives it airborne-sound-deadening and solid-borne-sound-damping properties.

The fire-protection barrier of the invention in the form of simple foil has a temperature range which as a function of the selection of the plastic is up to 250 degrees Celsius. The fire-protection barrier of the invention has sound-deadening values like those of conventional heavy foils, for the same weight per unit area. The density can be from 1.2 to 4.5 $kg/mm/m^2$, and the weight per unit area can be from 2 to 14 $kg/m^2$. Hardness can be up to 93 Shore A as a function of embodiment. In particular, it is possible to achieve stone-impact resistance via additions and/or modifications. In one specific embodiment, elongation can be from 50 to 800%, as a function of formulation. Elongation-tensile strength exhibits inverse correlation. The material can be resistant to temperatures down to −40 degrees Celsius. The material can be heat-resistant up to 250 degrees Celsius, as a function of the plastic used. The fire-protection barrier of the invention can be thermoformable.

In advantageous embodiments, the fire-retardant molding can comprise reinforcement in the form of a nonwoven, of a woven, or of a laid scrim made of a metallic or mineral material, made of glass fibers, made of plastic or made of wood and/or can comprise a support made of steel, aluminum, plastic, wood, or of a mineral material. The reinforcement can advantageously provide compliance with temperature requirements above 250 degrees Celsius.

The invention also provides a process for producing a fire-retardant molding. In the process of the invention, a thermoplastic material, in particular in the form of pellets, is melted and mixed with aluminum hydroxide or with magnesium hydroxide. The processing temperature here in the case of aluminum hydroxide is below 350 degrees Celsius, and in the case of magnesium hydroxide it is below 500 degrees Celsius, where the minimum temperature is selected via the melting point of the respective thermoplastic material used and is preferably in the range between about 120° C. and 220° C. After the mixing of the preferably pulverulent aluminum hydroxide and/or magnesium hydroxide with the molten thermoplastic material, the plastics composition, still hot, is converted to a desired form via a suitable die. This composition can in particular be used to extrude, calender, or to injection-mold a molding.

Equally it is possible to cool the fire-retardant composition obtained via mixing, after the mixing procedure, and optionally to comminute it to give pellets. Said pellets can then in turn be melted. The desired molding can then be extruded, calendered, or injection-molded from the molten composition. The proportion of the magnesium hydroxide and/or aluminum hydroxide acting as flame retardant here is in the range from 10% by weight to 90% by weight, in particular from 20% by weight to 80% by weight and particularly preferably in the range from 30% by weight to 75% by weight, based in each case on the total weight of the composition obtained via mixing.

A mixing extruder can be used to produce a finished product. Pellets can produced by using mixers-kneaders-single-screw extruders, or a finished product can be produced from the pellets by extruders and calenders.

In a concrete embodiment of the process of the invention, the inorganic flame retardant is either aluminum hydroxide, where a temperature below 350 degrees Celsius is maintained during the production of the molded piece, in particular of the foil, or magnesium hydroxide, where a temperature below 500 degrees Celsius is maintained during the production of the molded piece, in particular of the foil.

In an advantageous embodiment of the process of the invention for producing a fire-retardant molding, on discharge of the composition to give a molding, in particular a sheet-like product, the hot composition is laminated in an operation to one or more layers of a material different from the composition. The lamination can take place at elevated temperature (hot lamination).

The fire-retardant composition obtained via mixing can equally be applied in the form of what may be called a protective layer to at least one area of another molding which itself does not necessarily also have to be composed of a fire-retardant material.

The fire-protection barrier of the invention can be produced in a continuous production procedure or in a plurality of steps in the form of pellets or finished product in extruders, for example in a single-screw extruder or a twin-screw extruder, or calenders, in the form of single-layer product or multilayer product, in particular in the form of laminate with one or more layers made of other materials. The material of the fire-protection barrier of the invention can—as mentioned above—equally be used in the form of pellets in an injection-molding process and blowing process. In the case of production in the form of a multilayer product, the lamination processes are preferably undertaken without additional bonding products. Additions to the fire-protection barrier of the invention can be materials applied to the surface, for example polyvinyl chloride (PVC), thermoplastic elastomers based on olefins (TPO), aluminum, steel, or metals, in particular in the form of nonwovens, foils, or textiles. An addition to the surface of the fire-retardant molding of the invention can render it resistant to oils, fats, diesel, or gasoline. As an alternative to this, a colored or patterned layer can have been applied, or a layer providing any other visual effect, for example a foil. There can be reinforcement provided on the other side of the fire-protection barrier of the invention. This reinforcement can be composed of fibers, laid scrims, a nonwoven, or a foam, in particular of a metal in the form of foil, or laid scrim, or textile. The fire-protection barrier of the invention can be laminated into polyurethane (PU) or into glass-fiber-reinforced plastic (GRP), or into carbon-fiber-reinforced plastic (CRP).

The fire-retardant molding of the invention can be used in many applications, in particular for fire protection with advantageous acoustic properties and where thermal conductivity is disadvantageous. An advantageous use of a fire-retardant molding with one or more features of this description is found in land vehicles, watercraft, aircraft, or in buildings, on or in furniture, in engine compartments, as tarpaulins for covering articles, or for cladding or sheathing stairs, ceilings, walls, roofs, or floors.

Specifically, the fire-protection barrier of the invention is particularly suitable for applications in the construction industry, in particular in relation to the fitting-out of interiors (for example house construction or attic remodeling), for furniture, for rail vehicles, for cars, for trucks, for buses, in mechanical engineering, in shipbuilding, for commercial vehicles, for military vehicles, for aircraft, for engine compartments, and for partitions. Articles that can serve as substrate and that require protection can be those made of wood, of plastic, of mineral substances, or else of metal, etc. The fire-protection barrier of the invention can also be used as tarpaulins for the covering of articles, of vehicles, of buildings, and of parts of buildings, and it is also possible here to produce large surface-area sections via mechanical or thermoplastic bonding of individual fire-retardant foils of the invention.

Another particular application is the encapsulation of batteries or accumulators. The particular properties of the fire-retardant molding of the invention in the presence of an open flame, and/or the solid-borne-sound damping and/or air-borne-sound deadening that the moldings provide, are useful here.

The use of the extruded fire-retardant pipes or fire-retardant ducts for pipe ducts is particularly important, examples being wastewater pipes or ventilation pipes, supply ducts, or connection ducts. Additionally required moldings or connectors can be produced by the injection-molding process, blowing process, or thermoforming process. In respect of the use in the form of a fire-retardant coating or in the form of fire-retardant applied products or area on a support, it should be stated that the support can be one with specific fire-protection classification as a flammable product. The composite product, or the coated product, advantageously achieves A2 classification. Typical supports here can be steel, aluminum, wood supports, or beams and struts, ventilation ducts, water ducts, service ducts, or supply ducts.

Further advantages and advantageous embodiments of the invention are described by using the description below of an example of an embodiment in the form of a fire-retardant foil, also termed fire-protection foil:

DESCRIPTION OF THE INVENTION

In an advantageous embodiment of the process of the invention for producing the fire-retardant molding, specifically a fire-protection foil, a thermoplastic material, for example in the form of pellets, is melted. An amount of from 10 to 90% by weight of aluminum hydroxide or magnesium hydroxide is introduced in a mixing-screw system. The introduction is achieved by way of sidefeeders known in plastics processing, which can preferably also introduce another material in succession, in particular a filler. Equally, the mixing of the plastics melt with the flame retardant can also be achieved in a known stirred system or a kneader.

It is preferable that the proportion of plastic present is at least 20% by weight. It is moreover generally preferable that the proportion of aluminum hydroxide or the proportion of magnesium hydroxide is maximized, but an economic factor to be taken into account is that the product becomes correspondingly more expensive. With respect to the selection of the inorganic flame retardant, magnesium hydroxide is preferred for technical reasons, although it is more expensive than an aluminum hydroxide.

In particular in order to achieve appropriate mitigation of the high costs of aluminum hydroxide, and also the even higher costs of magnesium hydroxide, another filler, or else a plurality of other fillers, is/are added, where these in particular replace proportions by weight of the inorganic flame retardant, a particular material being calcium carbonate or else barium sulfate, where the latter gives the fire-protection foil appropriate advantageous acoustic insulation properties, since inter alia density is increased by the addition of the filler. In a specific experimental embodiment, 76.2% of aluminum hydroxide were admixed with a molten mixture of about 7.8% of EVA, 6% of EPDM, and about 6% of ENGAGE, and also 4% of synthetic oil, in the form of powder (all data in percentages by weight).

After the mixing of plastic and flame retardant, this mixture is discharged in such a way as to mold a flat product, in particular a foil. The discharge is achieved by way of a slot die or, as an alternative thereto, through an extruder. It is moreover optionally possible to use an appropriate calender. This method can give a flat section or sheet-like product in the form of a foil with a thickness which by way of example is from 1 mm to 10 mm, or even more, where the minimum thickness of the foil, i.e. of the molding, at which this is effective in providing its surprising fire-retardant properties is about 0.5 mm.

As previously mentioned, said sheet-like product has high flexibility as a function of the character of the plastics used, but can also be provided with appropriate mechanical properties, in particular in relation to an application, by using appropriate reinforcement in the form of a steel textile or else of a glass fiber textile or of any other reinforcing material.

The sheet-like product produced by the abovementioned process of the invention with a thickness of 4 mm can withstand the open flame of an Bunsen burner with a flame temperature of about 1700° C. for about 30 minutes, where the layers are consumed successively by combustion and a resultant flame-extinguishment effect occurs. A particular advantage of the material obtainable in the invention is that no flame spread takes place, since the water vapor discharged immediately extinguishes the flame, or the oxygen required by the flame is withdrawn. The extinguishment effect due to the aluminum hydroxide or magnesium hydroxide occurs at the surface of the material in the region in which the material has exposure to the flames. An observation made here is that the smaller the amount of aluminum hydroxide or magnesium hydroxide present in the material, the shorter the exposure time for which the fire-protection is retained.

Although aluminum per se melts at a temperature as low as about 650 degrees Celsius, the surprising flame-retardant effect of the material of the invention due to the advantageous properties of the aluminium hydroxide added to the molten thermoplastic material occurs in conjunction with all known thermoplastics.

In order to minimize the elimination of water from the added aluminum hydroxide or magnesium hydroxide during the production of the material of the invention, the addition of the preferably pulverulent aluminum hydroxide takes place at a temperature below about 350 degrees Celsius, preferably less than 250 degrees Celsius, and the addition of the preferably likewise pulverulent magnesium hydroxide takes place at a temperature of less than 500 degrees Celsius, preferably less than 250 degrees Celsius. The pulverulent aluminum hydroxide or pulverulent magnesium hydroxide here is directly admixed with the liquid plastics melt in the abovementioned amounts, where the temperature of the melt is in the range from 180 degrees Celsius to 350 degrees Celsius, depending on the nature of the plastic used. This method maximizes the proportion of undecomposed aluminum hydroxide or magnesium hydroxide present in the finished final product, in particular in the fire-protection foil.

The grain size of the inorganic flame retardant, in particular the average grain size, is preferably in the range from 0.01 mm to 0.4 mm. The grain diameter of the inorganic flame retardant has an important effect on the elasticity properties of the molding of the invention. The applicant has observed that large grain diameters give high ultimate tensile strength and low elongation and that small grain diameters give high elongation and low ultimate tensile strength of the final product.

What is claimed is:

1. A fire-retardant molding, comprising:
   a thermoplastic composition consisting of ethylene-propylene-diene rubber, ethylene-vinyl acetate, synthetic oil, and polyolefin elastomers; and
   an inorganic flame retardant mixed with said thermoplastic composition, said inorganic flame retardant being aluminum hydroxide or magnesium hydroxide in a proportion of from 20% by weight to 80% by weight and having a grain size in a range from 0.01 mm to 0.4 mm.

2. The fire-retardant molding according to claim 1, wherein said thermoplastic composition comprises a mineral filler selected from the group consisting of barium sulfate, chalk, calcium carbonate, and ground limestone, and/or 0.5% by weight of carbon black.

3. The fire-retardant molding according to claim 1, wherein the fire-retardant molding consists exclusively of said thermoplastic composition, said inorganic flame retardant, and an inorganic filler.

4. The fire-retardant molding according to claim 1, which further comprises a reinforcement in the form of a nonwoven, a woven, or a laid scrim made of a metallic or mineral material, made of glass fibers, made of plastic or made of wood, and a support made of a material selected from the group consisting of steel, aluminum, plastic, wood, and a mineral material.

5. The fire-retardant molding according to claim 1, which further comprises a reinforcement in the form of a nonwoven, a woven, or a laid scrim made of a metallic or mineral material, made of glass fibers, made of plastic or made of wood, or a support made of a material selected from the group consisting of steel, aluminum, plastic, wood, and a mineral material.

6. A process for producing a fire-retardant molding according to claim 1, which comprises the following steps:
   providing a molten thermoplastic material formed of a mixture of two or more substances selected from the group consisting of ABS, polyethylene, ethylene-vinyl acetate, ethylene-propylene-diene rubber, ENGAGE, polypropylene, polyvinyl chloride, and polyamide;
   mixing the molten thermoplastic material with a hydroxide material by carrying out one or both of the following:
      mixing the molten thermoplastic material with aluminum hydroxide at a temperature below 350° C.; or
      mixing the molten thermoplastic material with magnesium hydroxide at a temperature below 500° C.;
   setting a hydroxide proportion of the hydroxide in a range from 20% by weight to 80% by weight, and setting a grain size of the hydroxide material in a range from 0.01 mm to 0.4 mm; and
   discharging the composition obtained by mixing in the form of a fire-retardant molding according to claim 1.

7. The process according to claim 6, wherein the hydroxide proportion of one or both of the aluminum hydroxide or the magnesium hydroxide is in the range from 30% by weight to 75% by weight.

8. The process according to claim 6, wherein the discharging step comprises laminating the composition in one operation to one or more layers of a material different from the composition.

9. The process according to claim 6, which comprises molding the composition, after discharge, into pellets.

10. The process according to claim 9, which comprises melting the pellets to form a molten mass.

11. The process according to claim 10, which comprises injecting the molten mass into a mold to form a molding.

12. The process according to claim 6, which comprises extruding the fire-retardant molding in the form of a pipe or in the form of a duct.

13. The process according to claim 12, which comprises extruding the fire-retardant molding to form a pipe or duct for carrying water, air, or cables.

14. The process according to claim 6, which comprises applying the composition obtained via mixing to at least one area of another molding.

15. The process according to claim 6, which comprises introducing the aluminum hydroxide or the magnesium hydroxide into the plastics material in a stirred system or in a kneader or in a mixing screw system.

16. The process according to claim 6, which comprises introducing the aluminum hydroxide or the magnesium hydroxide into the plastics material by way of a sidefeeder.

17. A combination, comprising the fire-retardant molding according to claim 1 in combination with a land vehicle, a watercraft, an aircraft, a building, furniture, an engine compartment, a tarpaulin for covering articles, buildings, or parts of buildings, or a cladding for stairs, ceilings, walls, roofs, or floors, a fire-protection curtain, a cladding for an article, a pipe, a duct, a cover, or a supportive sheet.

18. The fire-retardant molding of claim 1, wherein said thermoplastic composition further consists of at least one of polyethylene, polypropylene, polyvinyl chloride and polyamide.

\* \* \* \* \*